Dec. 7, 1971   E. W. STRONG   3,624,854
CAR WASHER

Filed Aug. 26, 1969   4 Sheets-Sheet 1

Dec. 7, 1971  E. W. STRONG  3,624,854
CAR WASHER
Filed Aug. 26, 1969  4 Sheets-Sheet 4

United States Patent Office 3,624,854
Patented Dec. 7, 1971

3,624,854
CAR WASHER
Edward W. Strong, Setauket, N.Y.
(Curtis Road, Boxford, Mass. 01921)
Filed Aug. 26, 1969, Ser. No. 853,128
Int. Cl. B60s 3/04
U.S. Cl. 15—97    17 Claims

ABSTRACT OF THE DISCLOSURE

A car washer comprises a foam ring carried by a base plate mounted for oscillation at the end of a long tubular handle. The base plate and foam ring are oscillated by eccentric weights rotated by vane wheels driven by wash water supplied through the handle. A detergent-water mixture is also supplied through the handle and is discharged inside the ring to wash the surface area engaged by the oscillating foam ring. The water which drives the vane wheels is discharged against the car surface outside the ring to rinse an area previously washed.

---

The present invention relates to a car washer, and in particular one that is hand held and water operated.

Automobiles require frequent washing in order to preserve an attractive appearance. However, washing a car is a time-consuming and messy job which many car owners tend to neglect. While in many localities there are car washing establishments in which cars are washed by machine, such establishments are frequently busy so that it is necessary for a car owner to wait in line in order to have his car washed. Apart from the cumulative expense of having a car washed at frequent intervals, the time required for taking a car to a washing establishment and having it washed is frequently as much or more than that required to wash the car at home.

While previous washing devices have been proposed for use by a car owner, they have not proved sufficiently satisfactory to come into widespread use.

It is an object of the present invention to provide a hand held, water operated car washing device which is easy to use and highly effective and yet is sufficiently inexpensive as to be afforded by all car owners. With the car washer in accordance with the present invention, a car can be washed with detergent and rinsed in a single continuous operation so as to minimize the time and effort required for washing a car.

While the device in accordance with the present invention is herein referred to for convenience as a car washer since that is a primary purpose of the device, it will, of course, be understood that the device can also be used for other purposes, for example washing windows or the walls of a house.

The invention will be more fully understood from the following description of a preferred embodiment illustrated by way of example in the accompanying drawings in which.

Figure 3:
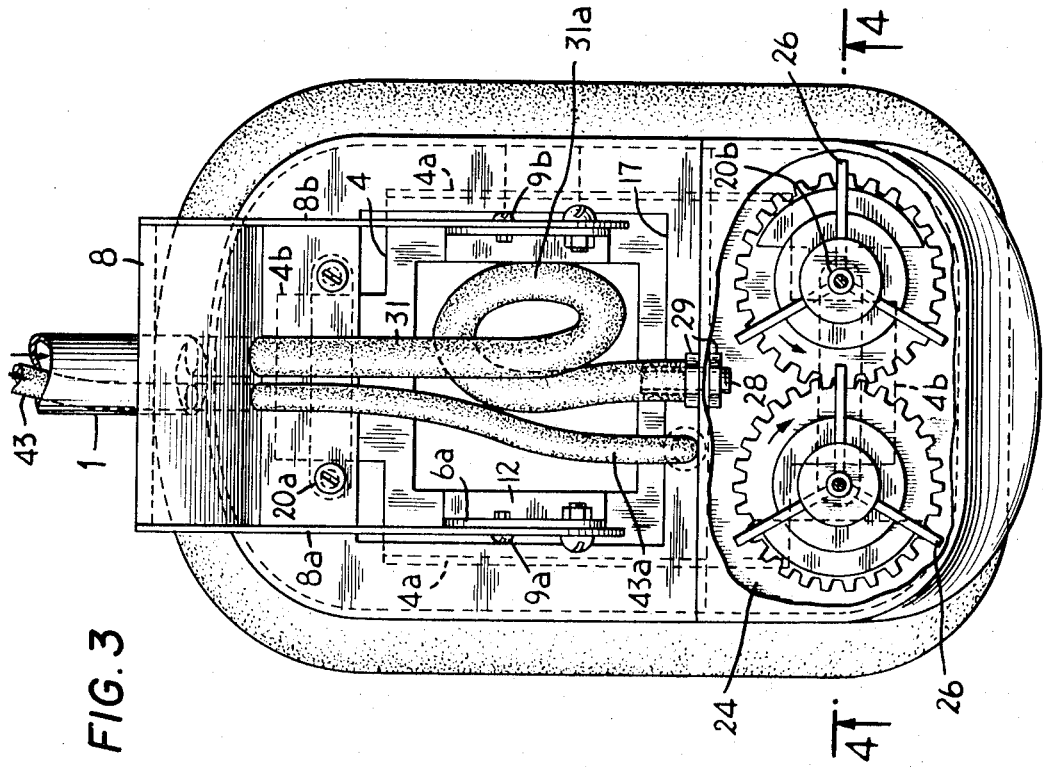
FIG. 3 is a plan with portions of the housing broken away to show the interior.

The washing device shown by way of example in the drawings comprises an elongated handle 1, a detergent supplying unit 2 at one end of the handle and a washing head 3 pivotally mounted at the opposite end of the handle.

The washing head comprises a support 4 which is pivotally mounted on the handle 1 and a movable washing member 5 which is oscillatable on the support. The support for the movable washing member is shown as a channel shaped member having upturned flanges 4a at opposite sides and longitudinal extensions 4b of reduced width at opposite ends. Brackets 6a and 6b projecting upwardly at opposite sides of the support 4 near its center in a lengthwise direction are pivotally connected by pins or bolts 7a and 7b to side arms 8a and 8b of a cross head 8 secured to the end of the tubular handle 1. Pins or screws 9a and 9b fixed in the side arms 8a and 8b respectively of the cross head and extending through arcuate slots 11 in the brackets 6a and 6b limit the angle of pivotal movement of the washing head relative to the handle. A central opening 12 is provided in the support 4.

Figure 4:
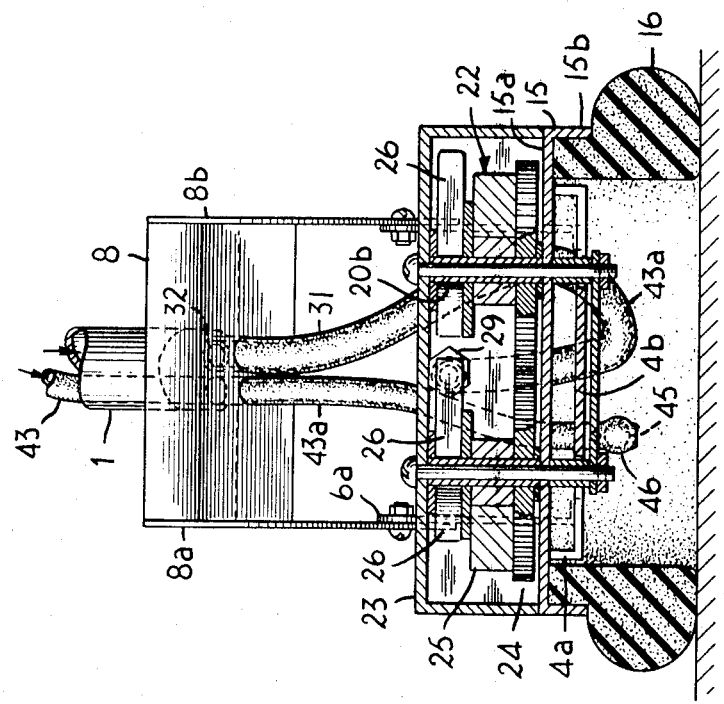
FIG. 4 is a cross section taken approximately on the line 4—4 in FIG. 3.

The movable washing member 5 comprises a relatively rigid base or back 15 and a flexible surface-engaging element 16. The base 15 is shown as being dish shaped with a flat plate portion 15a and a depending peripheral flange 15b. An opening 17 is provided at approximately the center of the base. As shown by way of example in the drawing, the washing member 5 is longer than it is wide and has rounded end portions and flat sides. The surface engaging element 16 is yielding and resilient so as to engage and wash or scrub the surface of a car or other object being washed without scratching or abrading the surface. While a bristle brush or fabric element can be used if desired, it has been found preferable to use a ring of foam rubber or plastic material. As seen in FIG. 4 the foam material has a cross sectional shape comprising a bulbous lower portion with a straight inner side and an arcuate outer side and an upwardly projecting stem portion which is received inside the peripheral flange 15b and abuts the lower face of the plate portion 15a of the base 15. The material of the surfacing engaging element 16 has the characteristics of being sufficiently soft and yielding to conform to the surface being washed despite curves or irregularities in the surface and sufficiently resilient to return to its original shape when relieved of pressure. It should also be resistant to abrasion and aging and capable of withstanding oils, greases and detergents.

The movable washing member 5 is movably mounted on the support 4 so as to be reciprocable in a direction lengthwise of the support. To provide such reciprocable mounting of the movable washing element 5, the plate portion 15a of the base 15 slidably engages the top of the support 4 while tie straps 18a and 18b secured on the lower face of the base 15a by bolts 19a and 19b and spacers 20a and 20b engage the lower faces of the extensions 4a and 4b of the support 4. As seen in FIG. 3 engagement of the spacers 20a and 20b with side edges of the extensions 4a and 4b guide the movable washing member laterally. The ends of the extensions 4a and 4b are engageable with the upstanding neck portion of the sponge element 16 at opposite ends of the base 15 to limit resiliently, lengthwise reciprocal movement of the movable washing element 5. The brackets 6a and 6b of the support 6 extend up through the opening 17 of the base 15.

Power operated drive means is provided for producing oscillatory or reciprocatory movement of the movable washing member 5 relative to the support 4. While an electric drive can if desired be used, it is preferable to utilize water power in order to simplify the apparatus and avoid any danger of electric shock.

The drive means is illustrated in the drawings as comprising two rotors 22 rotatably mounted on the bolts 19b which extend up through the base 15 and through a housing 23 which is positioned on an end portion of the base 15 and encloses the drive means. The rotors 22 comprise intermeshing gears 24 and eccentric weight portions 25 which are fixed with respect to the gears. By reason of the intermeshing gears 24 the two rotors 22 rotate at the same speed in opposite directions. The eccentric weights 25 are located relative to the gears so that they are always laterally opposite one another as the gears rotate. The rotors are driven by means of vanes 26 which are fixed relative to the gears 24 and weights 25 so that, as the gears rotate, the vanes of one rotor intermesh with the vanes of the other rotor without touching. While three vanes are shown on each rotor, it will be understood that more or fewer vanes may be used if desired. However, preferably the number of vanes is not less than two or more than six.

The rotors 22 are driven by a jet of water directed on the vanes by a nozzle 28 which extends through the rear wall of the housing 23 and is secured by nuts 29. Water under pressure is supplied to the nozzle 28 through the tubular handle 1. Connections between the tubular handle and the nozzle 28 are made by a flexible tubing 31 which is connected at one end to the nozzle 28 and at the other end to a fitting 32 provided in the cross head 8 which fits tightly on the lower end of the handle 1. A loop 31a in the tubing 31 providing greater flexibility is accommodated in the opening 12 of the support 4 and opening 17 of the base 15.

Figure 2:
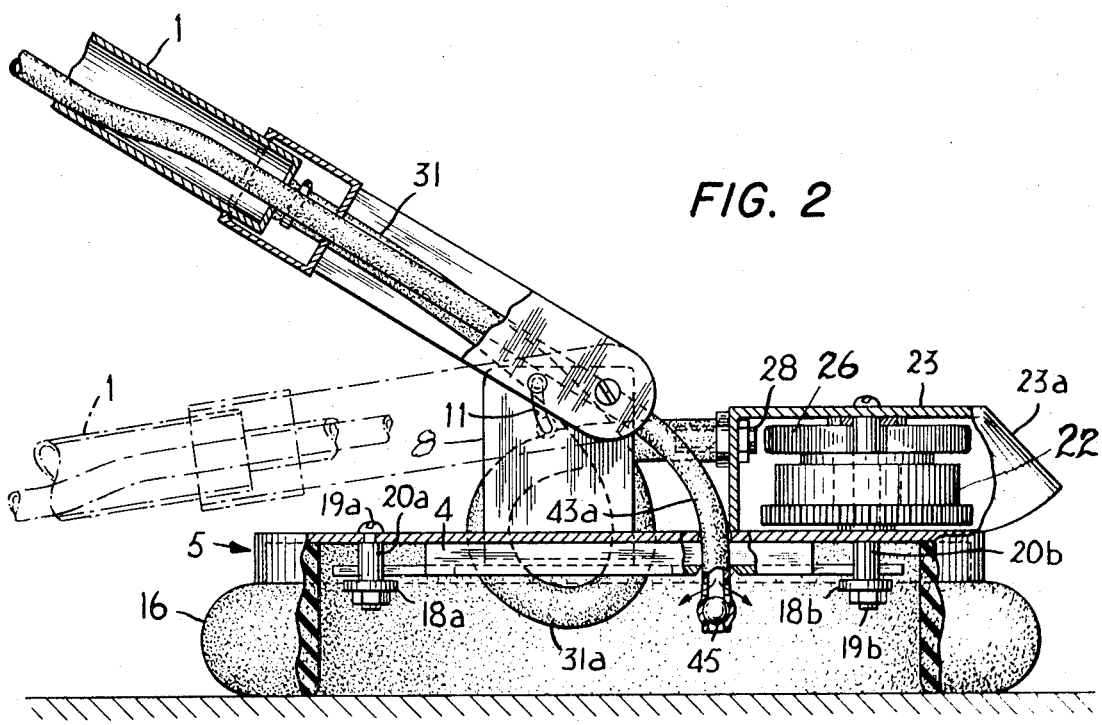
FIG. 2 is a side view on a larger scale of the head portion of the washer with certain portions broken away and shown in section.

As seen in FIG. 2 the front wall 23a of the housing 23 extends out beyond the end of the base 15 and is inclined so that the water ejected by the nozzle 28 after impingement with the vanes 26 to drive the rotors 22 is directed forwardly and downwardly toward the surface being washed.

While it is preferable to use two rotors as described, it will be understood that a single rotor can be used if desired. In this case the rotor is preferably centered laterally of the base 15 and no gears are required.

Figure 1:
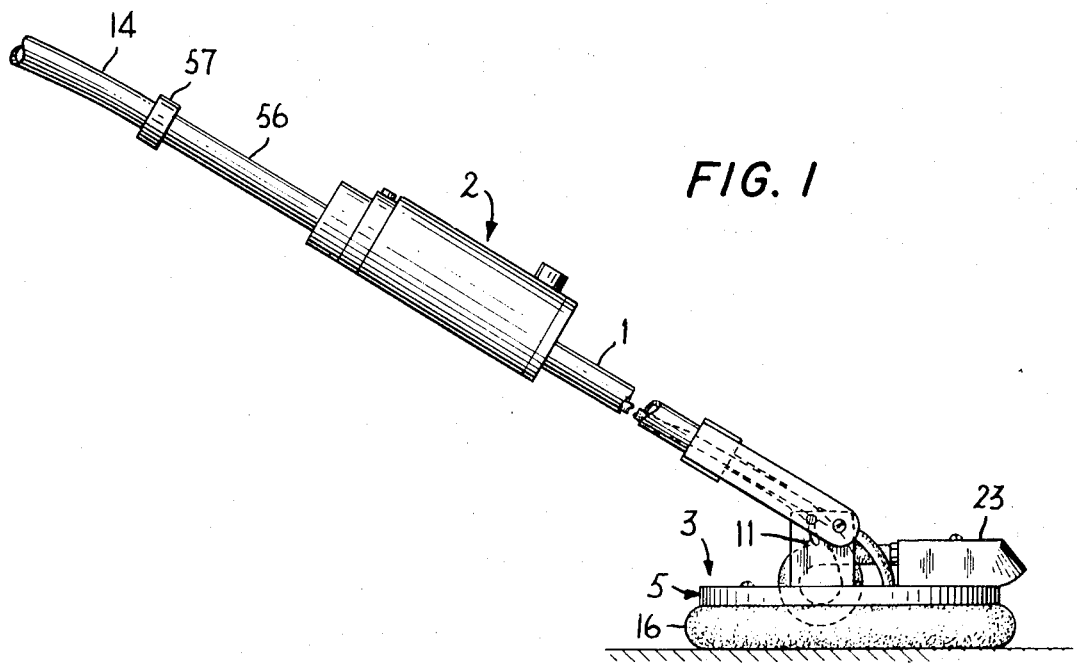
FIG. 1 is a side elevation of a car washer in accordance with the present invention, a portion of the handle being broken away in order to reduce the size of the drawing.
Figure 5:
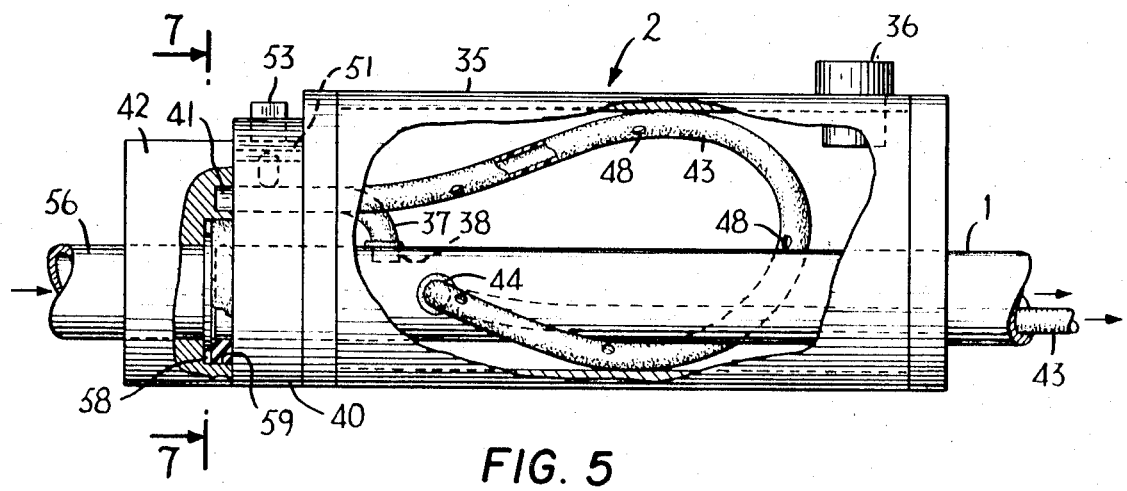
FIGS. 5 and 6 are a side view and plan respectively of a detergent supplying device for the washer.
Figure 6:
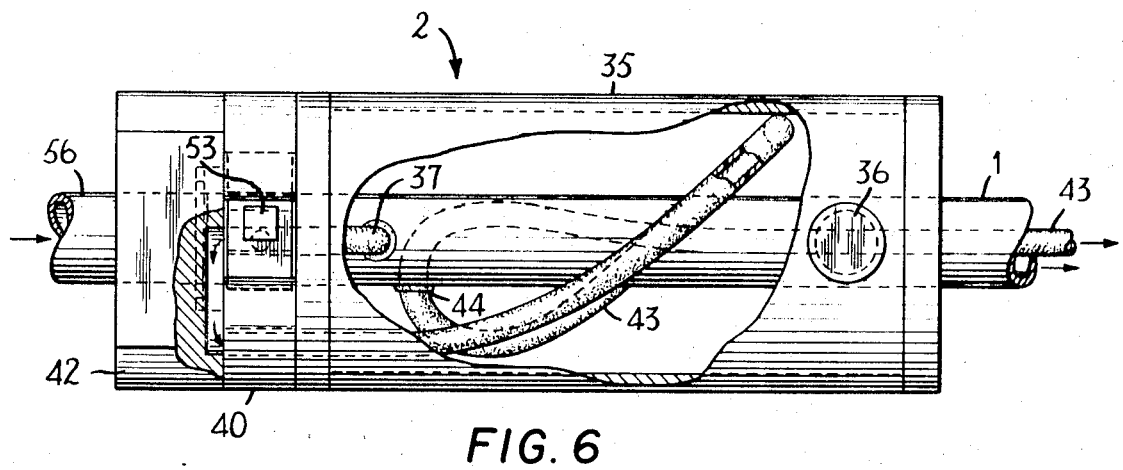

Means is provided for applying detergent to the surface being washed in order to cleanse it more thoroughly. As seen in FIGS. 1, 5 and 6, detergent is supplied by a unit 2 comprising a container 35 mounted on an outer end portion of the tubular handle 1. The handle 1 passes through openings in end walls of the container 35 in a fluid tight manner. A removable closure 36 is provided for an opening through which liquid detergent is introduced into the container 35. A flexible tube 37 having one end sealed into a side opening 38 of the tubular handle 1 extends through an end wall of the container 35 and through an opening in a valve unit 40 which is fixed to the end wall of the container and surrounds an end portion of the tubular handle 1. The other end of tube 37 opens into a transverse passage 41 formed in an end face of a tube retainer 42 which is sealed to the valve unit 40. Another flexible tube 43 likewise extends through an end of the cylindrical detergent container 35 and the valve unit 40 and opens into the transverse passage 41 so as to communicate with and receive water under pressure from the tube 37. The second tube 43 has a loop portion inside the container 35 and then extends in a water tight manner through an opening 44 into the inside of the tubular handle 1. The tube 43 then extends down inside the handle 41 to the opposite end of the handle where it passes through a water tight fitting in the cross head 8 and has an end portion 43a which extends down through openings in the support 4 and is provided with two small lateral openings 46, the end of the tube being closed.

The loop portion of the tube 43 inside the detergent container 35 is provided with a number of holes 48 opening into the container. When water under pressure is supplied to the tube 43 by the tube 27 through the connecting passage 41 a portion of the water is discharged through one or more of the openings 48 into the container 35 so as to place the detergent in the container under pressure and tend to displace a portion of the detergent. The detergent put in the container 35 is preferably a liquid detergent of the kind used for cold water washing. Such detergent is a heavy and somewhat viscous liquid having a specific gravity greater than water. The detergent hence tends to stay in the lower portion of the container and an interface is formed between the detergent and the water admitted to the container through the holes 48 in the tube 43. By reason of the pressure applied to the detergent by the water under pressure entering the container 35 and by reason of the pressure drop in the tube 43, a portion of the liquid detergent enters other of the holes 48 in tube 43 so as to provide a detergent-water mixture in the tube. This detergent-water mixture is delivered through the tube 43 to the interior of the annular surface-engaging element 16 of the movable washing member 5. By reason of the end portion 43a of the tube 43 extending through fairly close fitting holes in the support 4 and the base 15 of the movable member, the relative movement between the support and the movable member produces an oscillation of the end portion of the tube that projects inside the movable member so as to achieve a greater distribution of the detergent-water mixture over the surface being washed.

Figure 7:
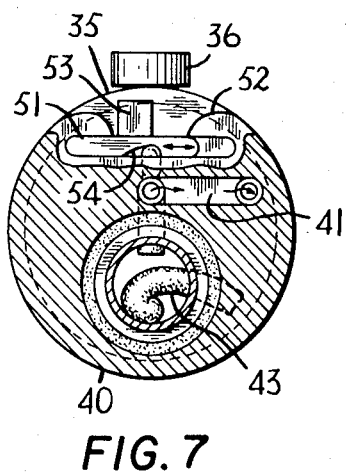
FIG. 7 is a cross section taken approximately on the line 7—7 in FIG. 5.

Valve means is provided for controlling the supply of water to the detergent container 35 and thereby controlling the supply of detergent-water mixture to the washing head. As illustrated in the drawings (FIGS. 5, 6 and 7), the valve means comprises a plunger 50 which is freely movable in an opening in the valve unit 50 which intersects at right angles with the opening through which the tube 37 extends. Opposite ends of the plunger 50 are preferably rounded. The inner end of the plunger 50 is engageable with the tube 37 in a direction crosswise of the tube. The outer end of the plunger 50 is engageable by a valve actuator 51 which is slidably mounted in a recess in one side of the valve unit 40. The valve actuator 51 is slidable in a direction chordwise of the valve unit 40 and perpendicular to the axis of the plunger 50. Portions 52 of the valve unit overhanging end portions of the valve actuator 51 retain the valve actuator in the recess while permitting it to slide in an endwise direction. The valve actuator is slidable by means of an outwardly projection handle portion 53. On its inner side the valve actuator 51 is provided with a cam surface 54 engageable with the outer end of the valve plunger 50. When the actuator is in the position shown in FIG. 7, the plunger 50 is in its radially outer position and the tube 37 is open so as to supply water under pressure to the container 35. When the sliding valve actuator 51 is moved toward the right as seen in FIG. 7, the plunger 50 is cammed radially inwardly by the cam surface 54 so as to pinch the tube 37 closed and thereby prevent the flow of water to the container 35.

Suitable means is provided for connecting the tubular handle 1 to a suitable water supply, for example a garden hose H (FIG. 1). The connecting means is shown as a metal or plastic tube 56, one end of which is provided with a hose type coupling 57 for connecting it to the hose H. The other end of the tube 56 extends into the tube retainer 42 and is provided with a flange 58 received in an annular recess 49 in the tube retainer. An end of the tubular handle 1 extends into the recess 49 and is surrounded by a hose type gasket 51. The flange 58 of the tube 56 seats against the gasket 51 to provide a water tight connecting while permitting rotation of the tube 51 relative to the tube retainer 42. While a valve unit for turning off the water supply may, if desired, be provided, for example in the tube 57, this is ordinarily not necessary since a faucet to which the hose 7 is ordinarily connected is provided with a valve.

The manner of use of the washing device in accordance with the present invention will be readily apparent from the foregoing description and accompanying drawings. When it is desired to wash a car or other surface with detergent, the container 35 is wholly or partially filled with liquid detergent of the kind commonly used for cold water washing. The tube 56 is connected to a water supply hose H by means of the coupling 57 and the water is turned on. The washer is held by the outer end portion of the handle 1 and if desired the tube 56 and the surface-engaging element 16 of the washing head 3 is held against the surface to be washed. In order to supply detergent to the washing head, the valve actuator 51 is in the position shown in FIG. 7 so as to open the tube 37. A detergent-water mixture is thereby applied to the surface being washed inside the annular surface engaging element 16. Water under pressure supplied through the tubular handle 1 is directed by the nozzle 28 against the vanes 26 of the rotors 22 so that the reaction of the rotating eccentric weights 25 produces a reciprocatory movement of the movable washing element 5, thereby scrubbing the surface to which detergent is supplied and thoroughly cleaning the surface. After driving the rotors 22 the water discharged by the nozzle 28 is directed downwardly by the housing portion 23a so as to engage the surface outside the annular surface engaging element 16. This water is free of detergent and rinses the surface that has been washed. Movement of the washing head back and forth along the surface thus washes an area or swath of the surface with detergent and rinses an adjacent surface which has been previously washed. The pivotal mounting of the head on the handle 1 facilitates washing all surfaces of the car both vertical and horizontal and curved as well as flat.

Figure 8:
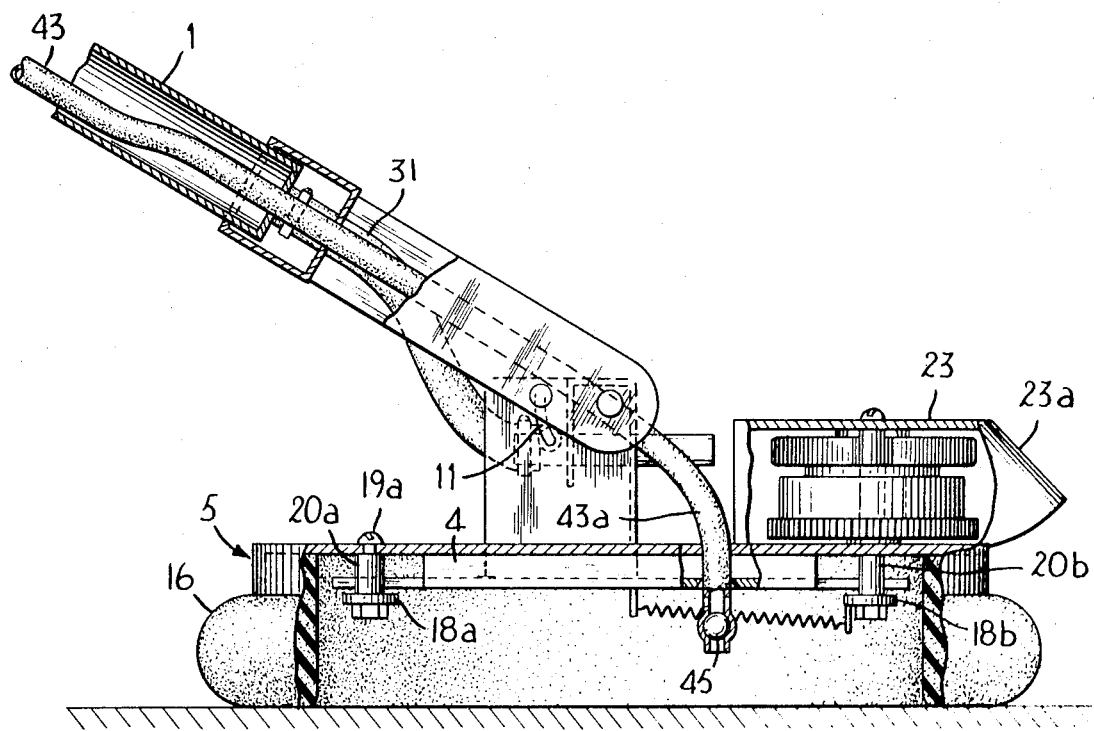
FIG. 8 is a view similar to FIG. 2 but showing a modification.

In FIG. 8 there is shown a modification in which a nozzle 28a for directing a jet of water to the rotors 22 of the drive means is mounted between the side arms of the cross head 8 so as to be stationary with respect to the support 4. An opening is provided in the rear of the housing 23 so that a jet of water from the nozzle 28a can be directed on the rotors. The discharge end of the nozzle 28a is sufficiently close to the rotors to avoid objectionable dispersion or energy loss in the water jet between the nozzle and the rotors. Moreover, the translational movement of the rotors by reason of their being mounted on the base 15 of the movable member 5 is approximately in the direction of the water jet directed by the nozzle 28a so that the jet acts continuously on the rotors despite their reciprocatory translational movement. Since the nozzle 28a is stationarily mounted with respect to the stationary support 4, it is not necessary to provide any loop in the flexible tube 31 as is illustrated in FIG. 2. The tube 31 needs to have only a sufficient flexibility to permit pivoting of the support 4 with respect to the handle 1 and is not subjected to cyclical flexing by reciprocation of the movable washing member 5.

It will thus be seen that the washing device in accordance with the present invention makes it possible for a car owner to wash his car quickly and thoroughly with a minimum of effort. Moreover, while the device in accordance with the invention is particularly suitable for washing cars, it can also be used for washing other surfaces, for example other vehicles or the windows or the walls of a building. While a preferred embodiment of the invention has been shown by way of example in the drawings, it will be understood that the invention is in no way limited to the illustrated embodiment.

What I claim and desire to secure by Letters Patent is:

1. A car washer comprising an elongate handle, support means at one end of said handle, washing means comprising a base member having upper and lower faces and movably carried by said support means for oscillatory movement relative to said support means and handle and surface-engaging means carried on the lower face of said base member and engageable with a surface to be washed, a rotor, bearing means rotatably mounting said rotor on the upper face of said base member with its axis of rotation perpendicular to the direction of movement of said base member, said rotor comprising a mass having a center of gravity eccentric of said axis and a vane wheel coaxial with said axis, said vane wheel being fixed relative to and rotating with said mass and having a plurality of angularly spaced vanes, means for supplying water under pressure and means for directing a high velocity stream of said water approximately tangentially on said vane wheel to impinge successively on said vanes to rotate said vane wheel and rotor and thereby generate by the eccentricity of the center of gravity of said mass an oscillatory inertia reaction force imparting oscillatory movement to said base member and surface-engaging means carried thereby relative to said support means.

2. A car washer according to claim 1, in which said surface-engaging means comprises a ring of soft foam material secured to said base member.

3. A car washer according to claim 2, in which said base member comprises a plate with a downwardly projecting peripheral flange and in which said ring of foam material is received inside said flange.

4. A car washer according to claim 2, in which said ring of foam material is generally rectangular with rounded ends and with a greater length than width.

5. A car washer according to claim 2, in which portions of said foam material comprise stops resiliently limiting said oscillatory movement of said washing means relative to said handle.

6. A car washer comprising an elongate handle, support means at one end of said handle, washing means comprising a base member movably carried by said support means for oscillatory movement relative to said support means and handle and surface-engaging means carried by said base member and engageable with a surface to be washed, two like rotors rotatably mounted on said base member with their axes of rotation perpendicular to the direction of movement of said base member, said rotors being disposed side by side and each comprising a mass eccentric of the axis of said rotor, a gear concentric with said axis and a vane wheel concentric with said axis, the gears of said rotors intermeshing with one another whereby said rotors rotate at the same speed in opposite directions, the centers of gravity of said eccentric masses being at all times laterally aligned with one another in a direction parallel to a line connecting the axes of said rotors, means for supplying water under pressure and means for directing a high velocity stream of said water approximately tangentially on said vane wheels to rotate said vane wheels and rotors and thereby generate by the eccentricity of said masses an oscillatory force imparting oscillatory movement to said base member and surface-engaging means relative to said support means in a direction approximately perpendicular to a line connecting the axes of said rotors.

7. A car washer according to claim 6, in which the vanes of said vane wheels are fixed on said rotors in positions to intermesh with one another without engagement as said rotors rotate, said water directing means directing said stream of water to the intermeshing portion of said vane wheels.

8. A car washer according to claim 6, in which said means for directing a high velocity stream of water on said vane wheels comprises nozzle means mounted on and stationary with respect to said support means.

9. A car washer according to claim 6, comprising deflecting means for directing water discharged from said vane wheels onto the surface being washed.

10. A car washer according to claim 1, comprising detergent reservoir means on said handle, said handle being tubular with a first channel for conducting water to said means for directing water to said vane wheel and a second channel for conducting detergent to means for supplying detergent to said surface to be washed.

11. A car washer according to claim 10, in which said surface engaging means comprises a ring of soft spongelike material secured to said base member and in which said detergent supplying means directs the detergent to the inside of said ring.

12. A car washer according to claim 11, comprising means for deflecting water discharged from said vane wheel unto said surface outside said ring to rinse said surface after it has been washed with detergent by said surface engaging means.

13. A car washer according to claim 11, in which said means for supplying detergent to said surface inside said surface-engaging means comprises a flexible tube connected to said second channel of the handle and extending through holes in said support means and said base member and with an end portion extending into a space inside said surface-engaging means, the relative movement of said support means and base member imparting an oscillatory movement to the end portion of said tube to distribute said detergent over an area of the surface being washed.

14. A car washer according to claim 11, in which said detergent reservoir means comprises a container for liquid detergent mounted on said handle spaced from said washing means, means for mixing water under pressure with said detergent and for conducting the resulting detergent-water mixture to said second channel of the handle and through said second channel to the interior of said surface-engaging means.

15. A car washer according to claim 14, comprising means for connecting said car washer to a supply of water under pressure to supply water to said first channel of the handle and to said detergent container, and means for controlling the supply of water under pressure to said detergent container including valve means for shutting off the supply of water to said detergent container and thereby discontinuing the supply of detergent to said washing means.

16. A car washer according to claim 15, in which said valve means comprises a flexible tube through which water is supplied to said detergent container and means for pinching said tube.

17. A car washer according to claim 14, in which said mixing means comprises a tube extending through said detergent container, said tube having an inlet portion, means connecting said inlet portion to a supply of water under pressure, and means connecting said outlet portion to said washing means, said tube inside said container having a plurality of openings to admit water to said container and admit detergent from said container to said tube.

References Cited

UNITED STATES PATENTS

| | | | |
|---|---|---|---|
| 1,476,433 | 12/1923 | Vandervoort | 15—22 A |
| 1,577,751 | 3/1926 | Paschall | 15—22 R |
| 1,905,424 | 4/1933 | Schlieper | 15—97 R |
| 3,283,352 | 11/1966 | Hu | 15—50 R |

LEON G. MACHLIN, Primary Examiner

U.S. Cl. X.R.

15—22